United States Patent [19]

Roschuk et al.

[11] 3,959,721

[45] May 25, 1976

[54] METHOD EMPLOYING D.C. PULSES FOR THE DETECTION OF DISSEMINATED OR MASSIVE MINERALIZATION WITHIN THE EARTH CRUST BY PRODUCING AN A.C. ELECTROMAGNETIC FIELD

[76] Inventors: John Roschuk, 329 Rouge Road; Merrick Holden, 321 Ashland Ave., both of Winnipeg, Manitoba, Canada

[22] Filed: June 19, 1974

[21] Appl. No.: 480,889

[30] Foreign Application Priority Data

June 25, 1973 United Kingdom............... 30098/73

[52] U.S. Cl. ................................................. 324/6
[51] Int. Cl.² ...................... G01V 3/08; G01V 3/10
[58] Field of Search........................... 324/.5, 1, 3-9, 324/13, 14, 41

[56] References Cited
UNITED STATES PATENTS

| 2,200,096 | 5/1940 | Rosaire et al. ........................... 324/1 |
|---|---|---|
| 2,685,058 | 7/1954 | Yost......................................... 324/1 |
| 2,735,980 | 2/1956 | Wait ....................................... 324/7 |
| 2,774,060 | 12/1956 | Thompson ......................... 324/41 X |
| 3,060,371 | 10/1962 | Townsend et al.................. 324/.5 G |
| 3,210,652 | 10/1965 | Seigel................................... 324/6 X |
| 3,243,695 | 3/1966 | Roark et al. ........................... 324/13 |
| 3,315,155 | 4/1967 | Colani.................................. 324/7 X |
| 3,398,355 | 8/1968 | Barringer et al................... 324/.5 G |
| 3,836,842 | 9/1974 | Zimmermann et al. ............. 324/3 X |

*Primary Examiner*—Gerard R. Strecker
*Attorney, Agent, or Firm*—Stanley G. Ade

[57] ABSTRACT

Pulses of direct current are applied to the ground by means of a pair of electrodes or by means of a coil. These pulses produce an alternating current magnetic field if they are in the vicinity of a zone of mineralization. These secondary currents are measured both during and after the duration of the pulses thus enabling the zone to be deliniated readily and easily. The quality, quantity and geometry of the mineralized zone may be ascertained by analysing the characteristics of the secondary, alternating current magnetic field.

4 Claims, 4 Drawing Figures

3,959,721

METHOD EMPLOYING D.C. PULSES FOR THE DETECTION OF DISSEMINATED OR MASSIVE MINERALIZATION WITHIN THE EARTH CRUST BY PRODUCING AN A.C. ELECTROMAGNETIC FIELD

BACKGROUND OF THE INVENTION

This invention relates to a method and an apparatus for geophysical exploration, and in particular to an improved method for detecting buried disseminated and/or massive sulphide or other mineralization by applying pulses of direct current to the ground while measuring the resulting alternating current magnetic fields set up within the zone of mineralization.

It is well known in the art of geophysics to prospect for buried zones of disseminated mineralization by means of the method known as "I.P." or "Induced Polarization". This method applies a series of abruptly terminated, high amplitude primary pulses of direct current to the ground while measuring the resistivety of the ground or measuring direct current flowing in the ground immediately after termination of the primary direct current pulses. This method has proven to be useful in detecting zones of disseminated mineralization but is relatively time consuming and expensive.

The present invention is based upon the discovery that a pulse or pulses of direct current applied to the ground in the vicinity of a zone of disseminated mineralization can cause an oscillation or alternating current within the zone of dissemination. The origin of such alternating current is not fully understood, but its existence has been established repeatedly in field measurements during and after application of the primary direct current pulse.

The discovery of this oscillation or alternating current results in many practical benefits. First, whereas in the conventional Induced Polarization method, the secondary currents measured are direct currents, in the present invention the secondary currents measured are oscillatory or alternating in nature and hence may be detected, amplified and otherwise electronically processed much more easily than is the case with the direct current measurements obtained with conventional Induced Polarization equipment. In addition, the present invention lends itself to remote sensing, e.g. performing surveys from moving vehicles such as trucks, boats or aircraft. Like Induced Polarization however, the present invention is useful in detecting the presence of zones of disseminated or massive sulphide mineralization.

According to one aspect, the invention consists of a method of and an apparatus for exploring the earth's crust for buried zones of massive or disseminated mineralization wherein the earth is energized by means of a pulse of direct current of predetermined amplitude and duration during and after which, measurements of alternating current magnetic fields are made.

With the foregoing objects in view, and other such objects and advantages as will become apparent to those skilled in the art to which this invention relates as this specification proceeds, this invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
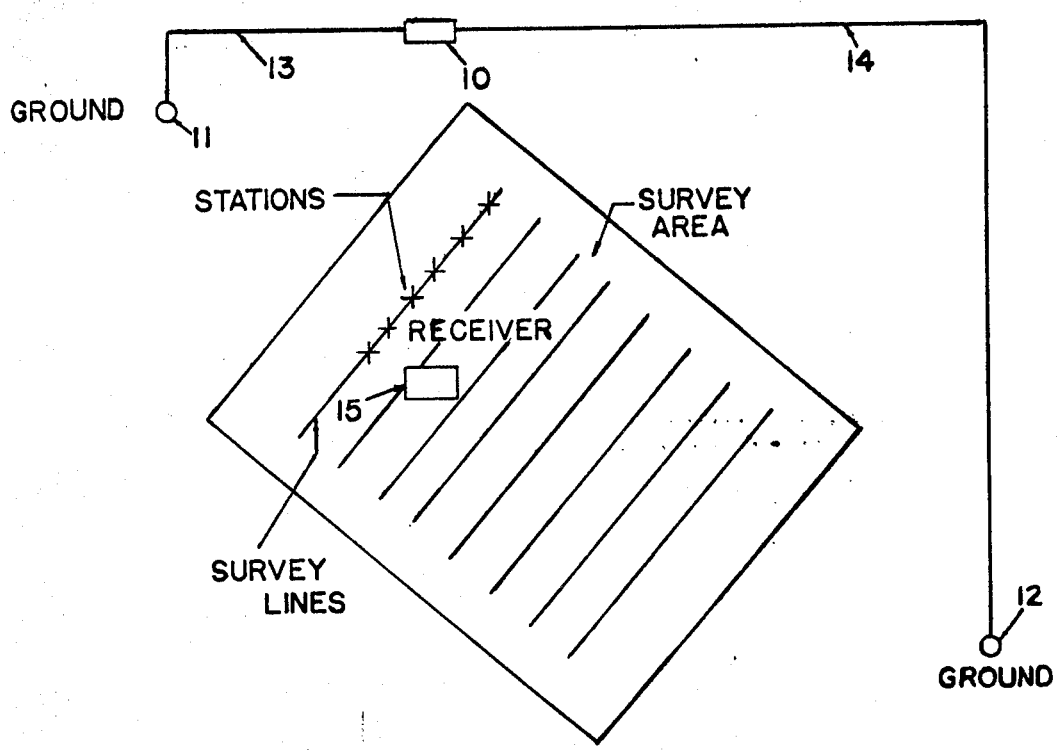
FIG. 1 is a diagrammatic view showing a typical area to be surveyed, with a grid of survey lines.

Referring to the drawings, and in particular to FIG. 1, a conventional current generator or transmitter 10 is connected to electrodes 11, 12 by means of electrical cables 13, 14 respectively. The currents caused to flow in the earth between the electrodes 11, 12 are similar to currents used in conventional I.P. work, i.e. they consist of periodic D.C. pulses of short duration with leading and trailing edges of relatively fast response time. A receiver 15 is used for detecting alternating current oscillations emanating from within the mineralized zone, e.g. of a frequency range of between about 580–35000 Hz, preferably about 2100 hz.

Figure 1A:
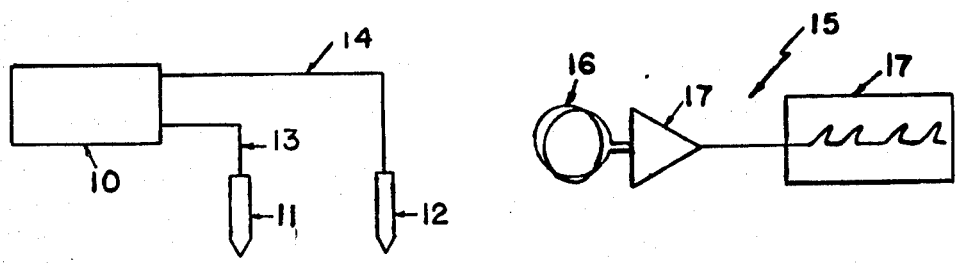
FIG. 1a is a block diagram of the system employed in FIG. 1.

As shown in FIG. 1a, the receiver 15 may comprise a portable pick-up loop or coil 16 which is tuned fairly broadly to A.C. signals of the above frequency range, and a conventional A.C. amplifier 17 the input of which is connected to the coil 16. The level of the output of the amplifier 17, as a function of time, is displayed and/or recorded by any conventional means such as a chart recorder 17A. Alternatively, the receiver may comprise a conventional sensing head of the kind used with proton precession magnetometers. The output of such sensing head consists of an A.C. signal the frequency of which is proportional to the strength of the ambient magnetic field. The secondary oscillatory currents which are produced when the primary pulses intersect an ore body distort the A.C. signal produced by the sensing head, and the change in amplitude and frequency of the resultant distorted signal is a function of the amplitude and frequency of the said secondary oscillatory currents.

It will be understood that the geometry of the system may be varied to suit local conditions, the nature of the expected ore bodies, etc. in accordance with conventional practice. Measurements may be made either at discrete locations or else continuously or semi-continuously along profiles or lines laid out in advance, as is usual in the case of conventional magnetic, gravity or I.P. surveys.

Figure 2:
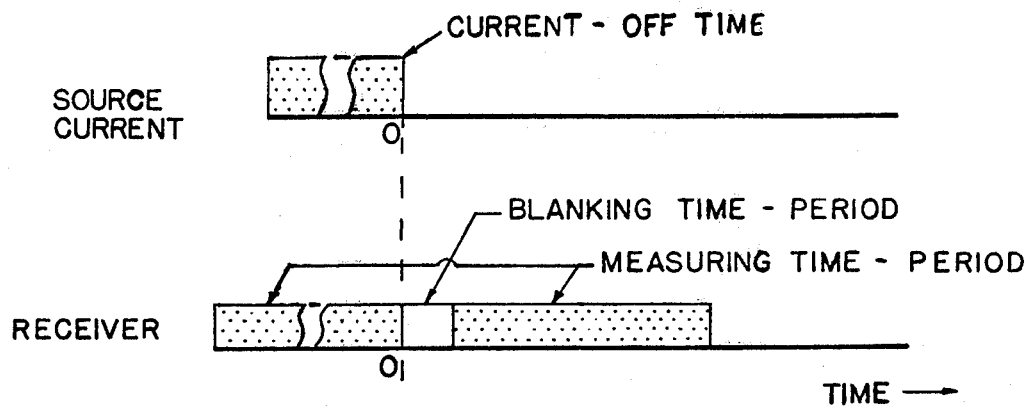
FIG. 2 is a graph showing the timing of the pulses employed in the present invention.

As shown in FIG. 2, the receiver 16 is gated out for a short interval (e.g. a few tens of milliseconds) after each primary pulse has terminated. During this short interval, unwanted electromagnetic transients tend to die down rapidly and hence they are separated from the desirable oscillatory alternating currents which may occur during energizing current on time and may persist a few seconds after the termination of the primary pulse, typically 4–5 seconds after the primary pulse.

Figure 3:
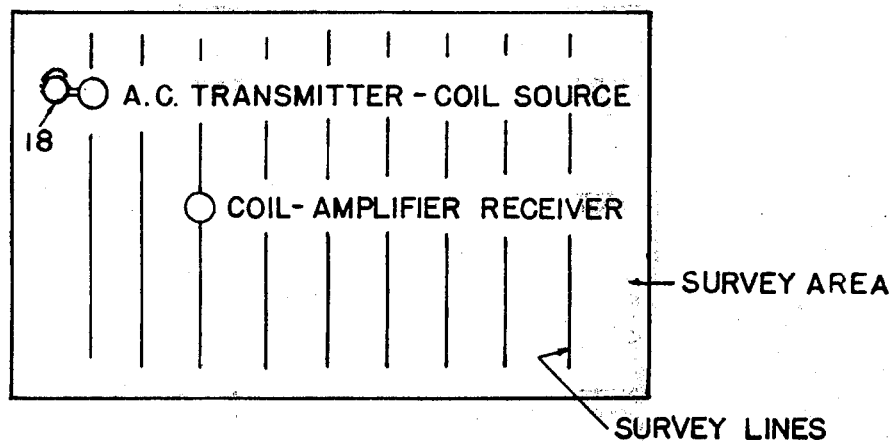
FIG. 3 shows an alternative embodiment wherein the primary pulses are induced into the earth by means of a coil.

Instead of energizing the earth by means of electrodes implanted in the earth, a large loop or coil 18 may be used, as shown in FIG. 3. The D.C. current transmitter and coil 18 may either be fixed in one location or moved across the area to be surveyed. If currents of sufficiently high amplitude are available, it would be possible to physically separate the coil 18 from the immediate proximity of the earth, e.g. to install it in a moving vehicle such as a truck or an aircraft and to use the device over either land or water.

It should be noted that the bandwidth figures given above i.e. between 580 to 35,000 Hz, have not been analyzed fully and may well be either fundamental frequencies or may be a harmonic or beat frequency above or below the stated bandwidth.

During the D.C. pulse on-time, an alternating current magnetic field is set up within the mineralized zone. This field is detected and measured by a suitable receiver employing any suitable detection means such as a coil, loop and the like.

A method is provided whereby the duration, amplitude and frequency of the oscillating secondary field set up within the disseminated mineralized zone is proportional to the quality, quantity and geometry of the mineralized zone.

The method permits measuring oscillating magnetic field parameters such as amplitude, duration and frequency which are proportional to the quality, quantity and geometry of the mineralized zone. The oscillation is set up either by the ionic and/or electronic resonance and/or character of the disseminated or massive zone or by the principle of harmonic filter, where the harmonic source would be the D.C. pulse applied to the earth and the geometry, and quality and quantity of the massive and/or disseminated zone would therefore be representative of the net impedance of the filter network. Thus the frequency measured would be the harmonic filtered by the filter network. Although both approaches to the oscillation source at this time appear to be quite valid, they are not fully understood. However, it appears that regardless of what the source of this oscillation may prove to be, it is not important; as the same basic analytical data is apparent regardless of oscillation source. The analytical data being namely a. Geometry and size of the mineralized zone.
b. Quality of the mineralized zone.
c. Quantity of mineralized particles within the zone.
d. Type of mineralization within the zone.

The method permits the detection of massive and disseminated mineralization by measuring alternating current magnetic fields caused by the application of direct current to the ground by means described earlier, with a receiver coil configuration that may be transported by land vehicle, water transport, aircraft or on foot.

The method described previously detects disseminated and massive mineralized zones at a fraction of the time required by present I.P. methods thus resulting in a great saving in survey cost.

Furthermore the method as described previously provides more analytical data than is possible by conventional I.P. Methods.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What we claim as our invention is:

1. A method of detecting disseminated and massive mineralization zones within the earth's crust comprising the steps of applying at least one abruptly terminated, high amplitude D.C. primary pulse to the ground, the said pulse producing an alternating current electromagnetic field where applied to a zone of mineralization, and measuring said alternating current electromagnetic field during and after the application of said primary D.C. pulse as an indication of the presence of a disseminated and/or massive mineralization zone.

2. The method according to claim 1 in which said method includes the step of applying said primary pulse by means of electrodes engaged within the ground.

3. The method according to claim 1 which includes the steps of applying said primary pulse by means of a coil spaced from the surface of the ground.

4. A method for the detection of disseminated and massive mineralization within the earth's crust comprising the steps of inducing at least one primary D.C. pulse into the zone being surveyed, and measuring the alternating current electromagnetic field set up by said at least one pulse within a mineralized zone within the zone being surveyed so as to determine the presence of disseminated and/or massive mineralization within the zone being surveyed.

* * * * *